No. 820,756. PATENTED MAY 15, 1906.
R. ARNO.
ALTERNATING CURRENT METER.
APPLICATION FILED FEB. 10, 1904.

2 SHEETS—SHEET 1.

Witnesses:
E. O. Nildeiram
Edwin G. Balinger.

Inventor:
Riccardo Arno
by George Musid
his attorneys

No. 820,756. PATENTED MAY 15, 1906.
R. ARNO.
ALTERNATING CURRENT METER.
APPLICATION FILED FEB. 10, 1904.
2 SHEETS—SHEET 2.
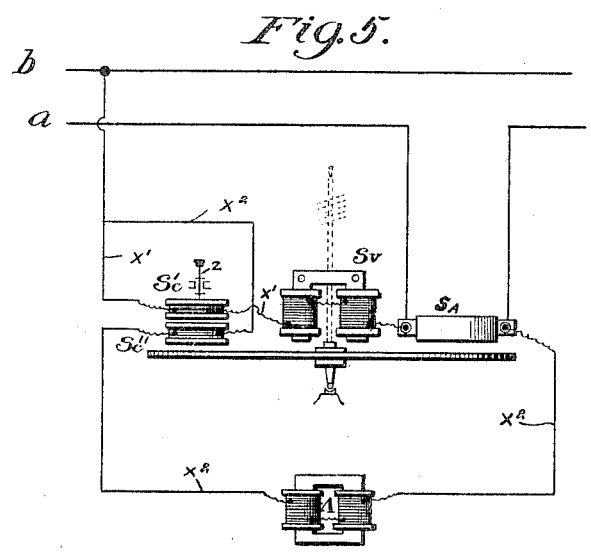

UNITED STATES PATENT OFFICE.

RICCARDO ARNO, OF MILAN, ITALY.

ALTERNATING-CURRENT METER.

No. 820,756.  Specification of Letters Patent.  Patented May 15, 1906.

Application filed February 10, 1904. Serial No. 192,958.

*To all whom it may concern:*

Be it known that I, RICCARDO ARNO, professor of electrical engineering, a subject of the King of Italy, residing at 3 Via Quintino Sella, Milan, Italy, have invented certain new and useful Improvements in Alternating-Current Meters; and I do hereby declare the following to be a full, clear, and exact description of the invention, such as will enable others skilled in the art to which it appertains to make and use the same.

It is well known that if an induction rotary-field motor-meter be used for the measurement of energy in a single-phase alternating plant with non-inductive loads the lag of phase of the current flowing through the volt-measuring coil behind the difference of potential between the ends of said volt-measuring coil may take any value whatever, even distant from ninety degrees, provided said value be sufficiently high as to allow of the volt-measuring coil being wound on an iron core, as it must be the case to secure the necessary degree of sensibility of the apparatus.

To comply with the above conditions the volt-measuring winding of the meter may consist of a coil wound on a straight iron core or of a combination of two coils respectively wound on each of the two shanks of a horseshoe core, the magnetic circuit being in either case entirely open.

In order better to explain the invention, the accompanying drawings may be resorted to, whereof—

Figure 1:
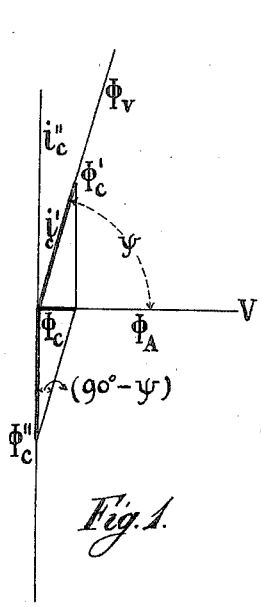
Figure 2:
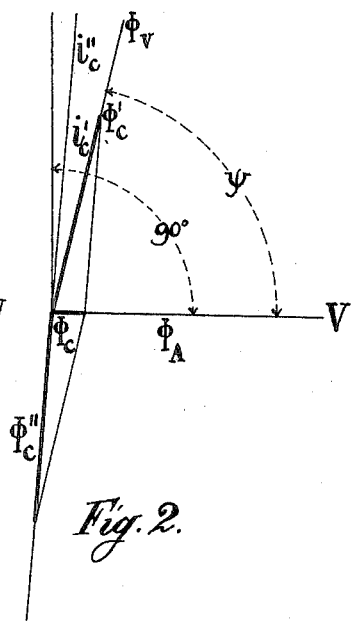
Figure 3:
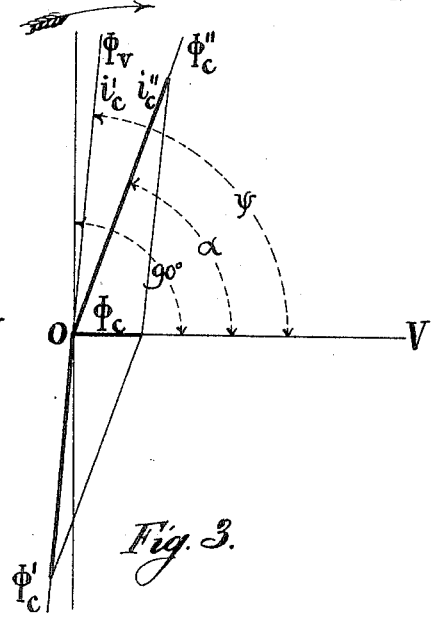
Figure 4:
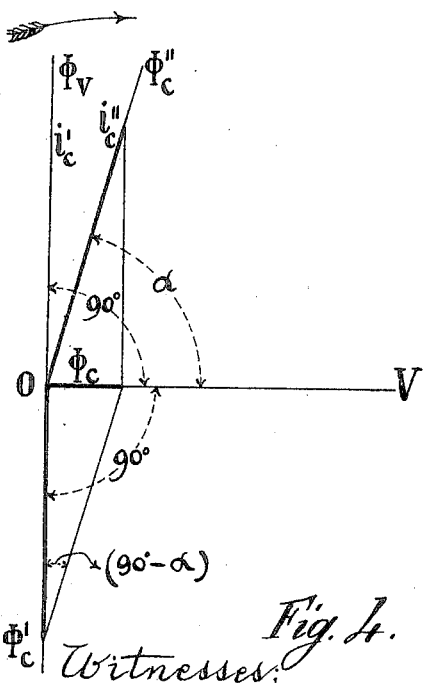

Figures 1 and 2 are diagrammatic sketches referring to the case of non-inductive circuits. Figs. 3 and 4 refer to the case of inductive circuits, and Fig. 5 shows an induction motor-meter embodying the principle of the invention.

Let us now suppose with reference to Fig. 1 the above lag of phase 4 to have a given value comprised between sixty degrees and ninety degrees and let V represent the difference of potential between the two mains of the plant. The flux of induction $\Phi_A$ produced by the current flowing through the ampere-measuring coil will be in phase with V, and the flux of induction $\Phi'_v$ produced by the current flowing through the volt-measuring coil will lag in phase behind V through an angle 4.

It is now to be remarked that in order to do away with the error arising from the frictional resistances without making the apparatus unsymmetrical the meter must be fitted with a special compensating coil consisting of a few windings of thin wire conveniently wound in parallel with the ampere-measuring coil of the meter, a constant current in phase with the potential difference V having to flow through said compensating coil. Under such conditions the current flowing through the compensating coil produces within the apparatus a flux of magnetic induction which remains constant however the current supplied to the translating devices may vary and which adds itself to the flux of induction produced by the current flowing through the ampere-measuring coil of the meter. In order to make the meter adjustable, means should be provided by which the compensating coil may be at will either removed from or approached to the inducted rotary disk, which turns under the combined influence of the ampere-measuring and volt-measuring currents, as well as of the compensating currents. In Fig. 5 the adjustment of the compensating coils is shown as being effected by means of an adjusting-screw $z$.

In meters based on the electrodynamometric principle, like that of Thomson, a constant compensating current in phase with the potential difference V is always at disposal, said compensating current consisting of the same current flowing through the volt-measuring coil. In said case, as it is well known, the volt-measuring and the compensating coils are inserted in series with each other. Such a constant current in phase with V is not at disposal by itself in induction-meters, but must be artificially produced, for instance, by shunting the compensating coil in series with an ohmic resistance of high value between the two mains of the system. Such an arrangement, which was suggested by Thomas Duncan, (see United States Patent 623,522,) is connected with a great inconvenience owing to the considerable dissipation of energy taking place through said ohmic resistance.

According to the present invention, a special process is resorted to in order to obtain a constant compensating flux $\Phi_c$, Fig. 1, in phase with V by resorting not to an ohmic resistance, as heretofore proposed, but to an inductive resistance, consisting of a coil wound on a closed magnetic-circuit iron core, the dissipation of energy due to such an inductive resistance being practically immaterial, owing to the great difference of phase (about ninety degrees) between the current flowing through the coil in question and the difference of potential at the ends of the said coil. This result is attained, according to the present invention, by employing two compensating coils, which are wound and located toward each other, so as to give rise to a total flux of magnetic induction $\Phi_c$, resulting from the two currents flowing through both coils, said total flux being equal to the vector sum of the two induction-fluxes $\Phi_c{}^c$ and $\Phi''_c$, respectively, produced by each of the aforesaid currents.

Let us also suppose the induction-flux $\Phi'_c$ to be in phase with the flux $\Phi_v$ and the induction-flux $\Phi''_c$ to lead in phase through an angle equal or nearly equal to ninety degrees beyond the flux $\Phi_A$, which is itself in phase with the potential difference V. Should $\Phi''_c$, as shown, Fig. 1, lead in phase beyond $\Phi_A$ just through ninety degrees it is sufficient to choose: $\Phi''_c = \Phi'_c \cos(90° - \Psi,)$ in order that the flux $\Phi_c$ (namely, the vector sum of $\Phi'_c$ and $\Phi''_c$) be in phase with flux $\Phi_A$ and with the difference of potential V.

As it is nevertheless impossible in practice to obtain the angle of lead of $\Phi''_c$ with respect to $\Phi_A$ to be exactly equal to ninety degrees, the conditions of the above equation will only be approximately fulfilled; but it is easy to see from Fig. 2 that it is always possible to obtain that the resulting flux $\Phi_c$ be in phase with $\Phi_A$. The result aimed at is obtained by causing the two aforesaid compensating-coils to consist, respectively, of a number N and a number approximately equal to $N \cos(90° - \Psi)$ of windings through which two currents of the same strength are to flow, one of said currents $i'_c$ being in phase with the induction-flux $\Phi_v$ and the other current, $i''_c$, leading in phase through an angle nearly equal to ninety degrees beyond the induction-flux $\Phi_A$.

In order to cause current $i'_c$ in phase with $\Phi_v$ to flow through one of the two compensating coils, there is nothing else to do besides inserting said compensating coil in series with the volt-measuring coil in the meter.

In order to cause current $i''_c = i'_c$ and leading in phase through an angle of about ninety degrees beyond $\Phi_A$ to flow through the other compensating coil, the following conditions should be fulfilled—namely, first, inserting in series with said compensating coil a large inductive resistance consisting of a coil wound on a closed magnetic-circuit iron core so as to cause the lag in phase of $i''_c$ behind $\Phi_A$ to be very nearly equal to ninety degrees; second, interchanging the terminals of the compensating coil in question with respect to the terminals of the other compensating coil so as to cause current $i''_c$ to be further shifted in phase of one hundred and eighty degrees with respect to $\Phi_A$, under which conditions the lagging in phase of about ninety degrees is transformed into a leading in phase through about ninety degrees, as desired; third, causing the impedances of the circuits wherein the two compensating coils are inserted to be approximately equal to each other.

All that has been heretofore said refers to the energy measurements in alternating single-phase non-inductive circuits. Should the method have to be applied both to inductive and non-inductive circuits, the lag of phase of the current flowing through the volt-measuring coil behind the difference of potential at the ends of said volt-measuring coil could no longer take any value whatever, comprised, for instance, between sixty degrees and ninety degrees, but should be equal or nearly equal to ninety degrees:

In diagram, Fig. 3, V is the difference of potential between the mains of the plant, and $\Phi_v$ is the induction-flux produced by the current flowing through the volt-measuring coil lagging in phase behind V through an angle $\Psi$, which, as hereinbefore said, must approach ninety degrees so far as it is practically possible.

The result aimed at in this case may be obtained by employing two compensating coils so wound and so located toward each other as to obtain a total induction-flux $\Phi_c$, produced by the two currents flowing through both coils equal or very nearly equal to the vector sum of the two induction-fluxes $\Phi'_c$ and $\Phi''_c$, respectively, produced by each of said two currents. Let us now suppose the induction-flux $\Phi'_c$ to lead in phase through an angle equal or nearly equal to ninety degrees beyond the potential difference V and the induction-flux $\Phi''_c$ to lag in phase behind the potential difference V through an angle $\alpha$ greatly differing from 0°, but much smaller than ninety degrees.

Supposing, as shown, Fig. 4, $\Phi'_c$ to lead in phase beyond V through an angle exactly equal to ninety degrees on the condition $\Phi'_c = \Phi''_c \cos(90° - \alpha)$ being fulfilled, the resulting flux $\Phi_c$ will be in phase with the potential difference V.

As nevertheless it is only possible in practice to cause $\Phi_c'$ to lead in phase beyond V through an angle approaching ninety degrees, but somewhat differing therefrom, the above condition will only be approximately fulfilled;

but it is easy to see that in any case, Fig. 4, a resulting flux $\Phi_c$ in phase with the potential difference V may be obtained.

The solution aimed at consists, therefore, in giving the two compensating coils a number of windings respectively equal to N cos (90° − α) and to N and causing two currents to flow through them, the strengths of which are equal, while their phases differ so as to give rise to two fluxes $\Phi'_c$ and $\Phi''_c$, respectively, leading in phase through an angle approximately equal to ninety degrees beyond V and lagging in phase through an angle equal to α behind the same potential difference V.

In order to obtain in one of the two compensating coils a current $i'_c$ of such phase as to cause the induction-flux $\Phi'_c$ to lead in phase through an angle of about ninety-degrees beyond the potential difference V, it is necessary to insert said compensating coil in series with the volt-measuring coil of the meter, care being taken that the terminals be interchanged with respect to the terminals of the other compensating coils, so as to give rise to a further difference of phase of one hundred and eighty degrees between $\Phi'_c$ and V, thus changing a lag of phase of about ninety degrees into a lead of phase of about ninety degrees, as it was aimed at.

In order that the phase of the current $i''_c$, flowing through the other compensating coil may be such as to give rise to an induction-flux $\Phi''_c$, lagging in phase through the angle α behind the potential difference V, an inductive resistance consisting of a coil wound on an open magnetic-circuit iron core is inserted in series with said compensating coil, so as to cause angle α greatly to differ from 0°, still having a value much smaller than ninety degrees, as it is necessary in order to obtain a resulting flux $\Phi_c$ in phase with the potential difference V.

In order to equalize the strengths of the two currents $i'_c$ and $i''_c$, the impedances of the two circuits into which the two compensating coils have been inserted are to be adjusted, so as to make them practically equal to each other.

Fig. 5 shows the practical arrangement of a meter embodying the principle of the invention as hereinbefore described, the same being inserted into one of the mains $a\ b$ of a single-phase alternating plant. In said Fig. 5, $S_A$ shows the ampere-measuring coil; $S_v$, the volt-measuring coil; $S_c'$ and $S_c''$, the two compensating coils, with the terminals interchanged with respect to each other, $S_c''$ being inserted in branch circuit $x^2$ in series with a great inductive resistance $A$, having a closed magnetic circuit, as described with reference to non-inductive circuits, and $S'_c$ being inserted in branch circuit $x'$ in series with the shunt or volt-measuring coil $S_v$.

Having thus fully described my invention, what I claim as new, and desire to secure by Letters Patent of the United States, is—

1. In an electric meter, the combination, with the volt-coil and ampere-coil, of two compensating coils coacting to produce a common compensating flux, one compensating coil being in series with the volt-coil, and an inductance device in series with the second compensating coil, the said inductance device and the second compensating coil being in parallel with the volt-coil and the first compensating coil.

2. In an electric meter, the combination, with the mains of the system, of an ampere-coil inserted in one main, a branch circuit from each terminal of the ampere-coil to the other main of the system, a volt-coil and a compensating coil in series in one of said branch circuits, a second compensating coil and an inductance device in series on the other branch circuit, said compensating coils being arranged to produce a common field, and an armature within the inductive influence of all the coils.

3. In an electric meter, the combination, with a volt-coil and an ampere-coil, of two compensating coils coacting to produce a common compensating flux, one compensating coil being in series with the volt-coil, and an inductance device, in series with the second compensating coil, the inductance device and the said compensating coil being in parallel with the volt-coil and the first compensating coil, the connections of the second compensating coil being reverse to those of the first compensating coil.

4. In an electric meter, the combination, with the volt-coil and ampere-coil, of two compensating coils coacting to produce a common compensating flux substantially in phase with the voltage of the system, said compensating coils being connected in branch circuits, and means for substantially equalizing the impedances of the branch circuits.

5. In an electric meter, the combination with the volt-coil and the ampere-coil, of two compensating coils coacting to produce a common compensating flux substantially in phase with the voltage of the system, said compensating coils being connected in branch circuits, and an inductance device in each branch circuit.

6. In an electric meter, the combination with the volt-coil and the ampere-coil, of two compensating coils coacting to produce a common compensating flux substantially in phase with the voltage of the system, said compensating coils being connected in branch circuits, an inductance device having a closed magnetic circuit in one branch circuit, and an inductance device having an open magnetic circuit in the other branch circuit.

7. In an electric meter, the combination with the volt-coil and the ampere-coil, of two compensating coils coacting to produce a common compensating flux substantially in phase with the voltage of the system, said compensating coils being connected in branch circuits, means for substantially equalizing the impedances of the branch circuits, and means for adjusting the position of the compensating coils.

In testimony whereof I affix my signature to this specification in the presence of two witnesses.

RICCARDO ARNO.

Witnesses
MICHELE DE DRAGO,
H. CARLO SALVOTTI.